United States Patent [19]

Poetsch

[11] Patent Number: 4,875,102
[45] Date of Patent: Oct. 17, 1989

[54] AUTOMATIC CORRECTING OF PICTURE UNSTEADINESS IN TELEVISION FILM SCANNING

[75] Inventor: Dieter Poetsch, Ober-Ramstadt, Fed. Rep. of Germany

[73] Assignee: BTS Broadcast Television Systems GmbH, Darmstadt, Fed. Rep. of Germany

[21] Appl. No.: 261,973

[22] Filed: Oct. 24, 1988

[30] Foreign Application Priority Data

Oct. 30, 1987 [DE] Fed. Rep. of Germany ....... 3736789

[51] Int. Cl.$^4$ ............................................. H04N 5/253
[52] U.S. Cl. ...................................... 358/214; 358/216
[58] Field of Search ................. 358/214, 215, 216, 54, 358/222

[56] References Cited

U.S. PATENT DOCUMENTS

| | | | |
|---|---|---|---|
| 3,806,643 | 4/1974 | Russell | 358/214 |
| 4,054,918 | 10/1977 | Kamogawa et al. | 358/214 |
| 4,104,680 | 8/1978 | Holland | 358/214 |
| 4,236,183 | 11/1980 | Howe | 358/214 |
| 4,255,764 | 3/1981 | Howe | 358/214 |
| 4,296,438 | 10/1981 | Stemme et al. | 358/214 |

FOREIGN PATENT DOCUMENTS

| | | |
|---|---|---|
| 0162486 | 11/1985 | European Pat. Off. . |
| 2139037 | 10/1984 | United Kingdom . |
| 2145899 | 4/1985 | United Kingdom . |
| 2165417 | 4/1986 | United Kingdom . |

OTHER PUBLICATIONS

"New Investigations on Picture Steadiness of Motion Pictures in Projection"—Journal of the SMPTE, vol. 77,1/68.
"Challenges to the Concept of Cancellation", Journal of the SMPTE, Dec. 1981, Roland J. Zavada.
"Image Unsteadiness in 16 mm Film for Television'"—Journal of the SMPTE, vol. 80, Oct. 1971.

Primary Examiner—Jin F. Ng
Assistant Examiner—Stephen Brinich
Attorney, Agent, or Firm—Frishauf, Holtz, Goodman & Woodward

[57] ABSTRACT

For detecting picture unsteadiness in television pictures obtained from a film scanner in which the film moves continuously, the sprocket holes and the picture boundaries on the film and additional reference marks that may be provided on the film outside of the picture boundaries were scanned by an oblique sensor to produce pulse signals indicating both vertical and horizontal deviations. A reference pattern is produced by running the film through the scanner so equipped and thereafter when the film is scanned for television transmission the reference pattern is compared with the contemporary pattern to provide correction signals for steadying the television pictures. Normally only one form of measurement will be used, but the others are available for automatic or prompt manual substitution if the pulse signals in use become unreliable during any particular portion of the film scanning.

49 Claims, 7 Drawing Sheets

AUTOMATIC CORRECTING OF PICTURE UNSTEADINESS IN TELEVISION FILM SCANNING

This invention concerns automatic correction of picture unsteadiness in television scanning of films that are continuously moving while being scanned. An important deficiency in reproduction quality of films in television compared with direct viewing of scenes with an electronic camera are the visible horizontal and vertical unsteadiness of the film scanning picture.

The partly periodic and partly random unsteadinesses of the picture position can have various causes. For example positioning errors both in the motion picture camera and in the negative/positive copying machine may be involved. Again, nonuniformity in the running of the film scanner can lead to picture unsteadiness and, in addition, tolerances in the dimensions and placement of perforations ("sprocket holes") in the film material can have a disturbing effect. Even when very narrow mechanical tolerances are maintained, the summing of all errors can nevertheless lead to picture unsteadiness which is visible in a television monitor.

For a long time the causes, effects and avoidance of these errors has been the subject of reports and discussions in various publications, for example, Frielinghaus "New Investigations on Picture Steadiness of Motion Pictures in Projection", Journal of the SMPTE, January 1968, p. 34 ff; Zavada "Challenges to the Concept of Cancellation", Journal of the SMPTE, December 1981, p. 1173 ff and Wood. Sanders and Wright "Image Unsteadiness in 16 mm film television", Journal of the SMPTE, October 1971, p. 812 ff.

A method of correcting nonuniformity of motion in a film scanner is proposed in European patent Publication EP No. 0 162 486 A2, in which a geared roller coupled to the film is used to generate tachopulses for controlling the line frequency of a CCD line sensor. In this system, however, only the uniformity of movement of the film scanner can be compensated and that only in part. Furthermore, video signal changes which are produced by the variable integration time of the CCD line sensor must also be compensated Methods for measuring and electronically correcting picture unsteadiness are described in British patents Nos. 2,139,037 and 2,165,417, in which the video signals of successive film pictures are evaluated by means of a movement vector measurement of the picture content. Such a measurement is to be excluded, however, if no sufficiently distinct picture information is present, such as sharp stationary edges, for example. When there was camera movement or if the picture was being "zoomed" false results could be produced in these measurements.

In British patent No. 2,145,899 a method is described in which the edge or framing of the film picture is scanned and compared with the synchronizing pulses of studio equipment to determine unsteadiness of position. This method is also subject to error because certain film formats exist, for example Cinemascope or Super 8, which have no definitive boundaries, borders or framing of the picture on the film, and in unfavorable cases film pictures can even overlap. Finally, the various film formats have framing of different sizes. These borders can also continuously change when a copy is made. The border, moreover, can be either black or transparent. In consequence there is a risk that no position deviations will be detected, or erroneous picture deviations will be reported, or even that rectangles in the picture content may be mistaken for picture edging. When films are copies in many cases the borders of the picture are generated only with a copying machine, so that in these cases only positioning errors of the copying machine and nonuniformformity of movement of the film scanner can be corrected.

In view of the difficulties above noted, it has already been proposed to provide for exposure outside of the picture of certain markings in the film camera which are intended to serve position references for picture steadiness control during film scanning. This has the disadvantage, however, that a special camera, or a modification in an available camera, is necessary for carrying out this type of correction. Furthermore, film material already available without marking cannot be corrected this way. Besides, in many copying machines the region outside of the picture is not copied, so that this method is usable only for original negatives.

SUMMARY OF THE INVENTION

It is an object of this invention to provide picture steadiness by a method avoiding the above described difficulties and to obtain an optimal picture steadiness correction in every case, even with damaged film material or older copies. A further object is to provide apparatus for practicing such a method.

Briefly, while scanning the film at an oblique angle to the direction of advance of the film, at least one kind of reference features of the film are scanned, which may be the sprocket holes of the film, and/or marks produced on the film by photographic exposure and/or picture edge boundaries, in order to produce a scanned position pattern. Then the scanned position pattern is compared with a reference pattern to produce a difference signal, after which at least one correction signal value is obtained from that difference signal. Finally, by means of one or more correction signal values, an electronic compensation of horizonal unsteadiness or vertical unsteadiness, or both, is or are performed for the scanned motion picture film frames.

The method of the invention has the advantage that horizontal and vertical deviations from position are simultaneously protected with one sensor, while a scanned position pattern is generated from all relevant position information.

Preferably two or more kinds of reference marks, perhaps even picture content in some cases, are scanned so that automatic or quick manual transfer can be provided, if, for example, the sprocket holes are damaged or off size on some part of the film.

When a film is copied in a manner in which the relation of a picture content to the sprocket holes is lost, it is particularly advantageous to be able to switch to other measurement criteria. That can be done manually or automatically, also when one of the many kinds of reference features drops out or is only doubtfully picked up in the preliminary run to make the reference pattern.

Besides, in the case of a copy for which the picture boundary is measured, when a sudden change of the boundary or the disappearance of boundary measurements occurs, there can be automatic switching to measurement by reference to the sprocket holes with which the film has been perforated. At the same time the reliability of the sprocket hole measurements can be checked with geared roller tachopulses.

Thus by a hierarchical ordering of the measurement criteria, a substantial increase of the measurement reliability can be obtained even when some measurement values drop out or are disturbed.

BRIEF DESCRIPTION OF THE DRAWINGS

The invention is further described by way of illustrative example with reference to the annexed drawings, in which.

DESCRIPTION OF THE ILLUSTRATED METHOD AND APPARATUS

As is well known, a television system has a fixed time interval limitation for its active scanning lines as a result of the horizontal and vertical blanking intervals. Picture unsteadinesses of a continuously moving motion picture film arise principally because changes of the film picture in successive film frames have no constant relation the television blanking intervals. Thus, unsteadiness of the picture can be detected or measured by comparison of the position of the picture boundaries of every picture on the film with the television blanking intervals (see in this regard British Patent No. 2,145,899).

Figure 1:
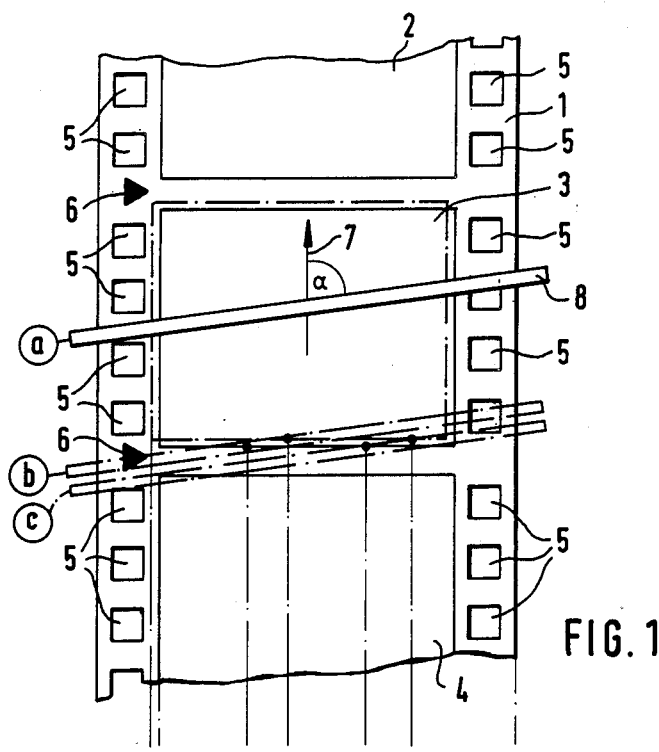
FIG. 1 is a diagram of a portion of a strip of film shown in combination with different positions of a scanning device.

FIG. 1 shows a strip 1 of film on which are film "frames" 2, 3 and 4, sprocket holes 5 and photographically exposed postioning marks 6. Each film frame is bounded on all sides by a picture border. The border of the frame 3 is shown by a solid line rectangle in one position and by a chain doted line rectangle in an offset position. This film strip 1 runs at a known constant speed in the direction of the arrow 7 through the scanning station of a television film scanner and is scanned with an error detection scanning device 8, for example a line sensor which the film encounters before it reaches the film scanning station. The line sensor 8 is disposed obliquely above or in front of the film, inclined at an angle of about 75° to the film advance direction (arrow 7).

Figure 2:
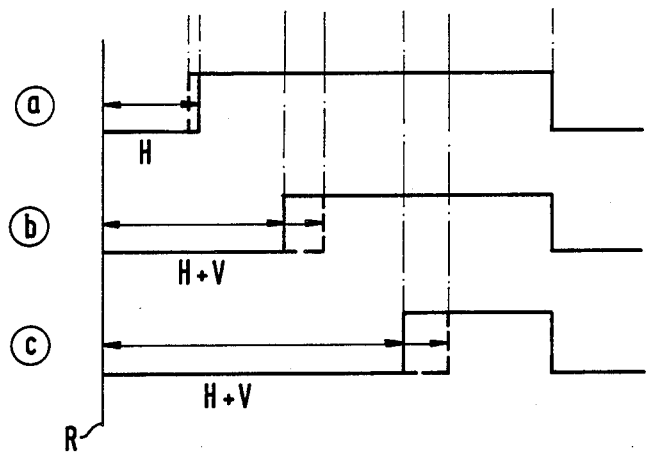
FIG. 2 is a timing diagram for pulse signals respectively derived from the different positions of the scanning device in FIG. 1.

In a first running of the film through the equipment, the portions of the boundaries of each film frame are measured by scanning device (line sensor 8) for example the left and lower boundaries. In this first run, for each of the positions a, b and c of the scanning device (shown in solid lines) pulse signals a, b and c shown in FIG. 2 are respectively produced which have a duration limited by a time dependent reference R, for example the television horizontal blanking. When there is a deviation of the film picture caused by picture unsteadiness as shown in the chain doted boundaries of film frame 3, there are then produced shifts of the leading edges of the pulses signals a, b and c (shown in broken lines). For generating a reference pattern very many (about 1000) such measurements of the picture boundaries, for example, are carried out, and these signals which are all related to each other are then stored.

Instead of the generation of a reference pattern in a manner just described, of course a reference pattern could also be produced from the normalized measurements of sprocket holes or of dots made by photographic exposure.

In a following movement of the film through the scanner for television operation in real time, the respective contemporary and measurement values are compared with the reference pattern and utilized to generate electronic compensation of picture unsteadiness.

As already mentioned, instead of proceeding as in the preceding example by deriving corrections for horizontal and vertical picture unsteadiness by reference respectively to the left and lower borders of the picture, it is possible to make comparable measurements with respect to one or all of the sprocket holes of the film and or of photographically produced marks on the film outside of the pictures, whether alone or in combination with measurements of the picture boundaries, for generation of correction signals.

Figure 3:
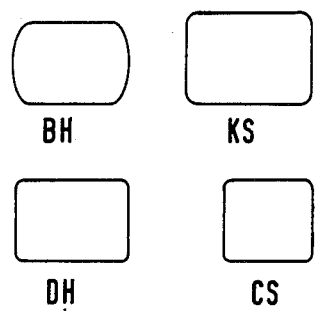
FIG. 3 illustrates, together with designating letter codes four different shapes of sprocket holes used on motion picture film.

FIG. 3 shows four different standard shapes of sprocket holes for 35 mm films which can be scanned either with the scanning device 8 or with a scanning device 8' with a size corresponding to such a sprocket hole 5'. The scanning of the sprocket hole positions 8', a', b', c', d' as well as the duration of a corresponding error signal takes place in the same manner as already described in detail in connection with FIGS. 1 and 2.

Figure 5:
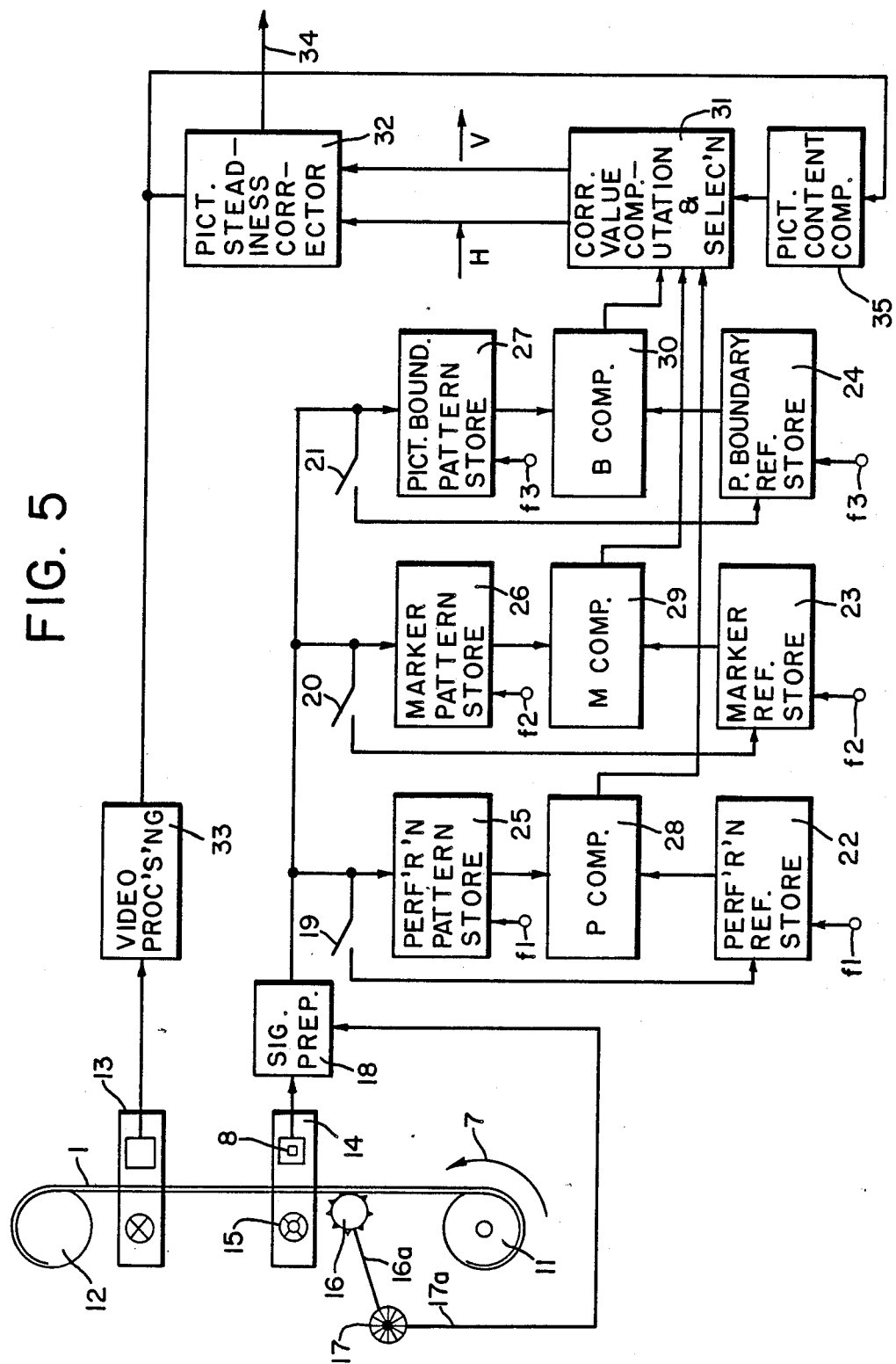
FIG. 5 is a circuit block diagram of an apparatus for carrying out the method of the invention.

The choice or determination of the reference marks of the film frames to be used for generation of correction signals takes place automatically and will now be explained in more detail in connection with FIG. 5. This figure shows a circuit for carrying out the method of the invention, showing only those parts of the equipment which are necessary for explanation of the invention.

The film 1 is continuously advanced in the direction of the arrow 7 by a film transport mechanism, not shown, from a supply reel 11 to a take-up reel 12. Just ahead of the scanning station 13 for opto-electronic conversion of the film pictures into video signals, a device 14 for detecting feature unsteadiness is located in the path of the film 1. This device 14 can for example consist of a light source 15 on one side of the film and a light sensor 8 on the other side of the film. In addition, in the film path ahead of the device 14 there is also provided a sprocket-geared roller, the rotary movement of which is transmitted to a tachodisc 17 by a shaft 16a on which both the roller 16 and the tachodisc 17 are fixed. The tachodisc 17 produces pulse signals corresponding to the film advance velocity (by means not shown but only symbolically indicated in the radii drawn on the tachodisc 17 in FIG. 5). These film speed pulses are provided to one input of the signal preparation circuit 18, to which the output signals of the device 14 are also supplied for processing.

The output of the circuit 18 is, on the one hand connected directly with the respective memories 25, 26 and 27 for storing the currently picked up scanning pattern and, on the other hand, connected selectively through switches 19, 20 and 21 to respective memories 22, 23 and 24 for storing of the reference pattern. Each of these reference pattern memories contain a correlation circuit for deriving a reliable reference pattern from a thousand or more measurements of film-position-indicating features.

The memories 22 and 25 serve for storing signals derived from the sprocket holes; the memories 23 and 26 serve for storing signals derived from photographically produced marks outside of the picture borders, and the memories 24 and 27 for storage of signals derived from the picture boundaries.

In order to compare the reference patterns deposited in the memories 22, 23 and 24 with the currently stored scanning patterns in the respective memories 25, 26 and 27, comparators 28, 29 and 30 are provided in which correction signals are generated according to the particular pattern comparisons. These correction signals are then applied to a computing circuit 31 for calculation of the horizontal and vertical offset of the particular film frame and also for determination and selection of the correction signals for the compensation. Horizontal and vertical vector signals are then made available at the output of the computing circuit 31 which are supplied to a correction circuit 32 for compensation of picture unsteadiness. The correction circuit 32 also has inputs which receive a video signal processed according to television standards from a video signal processing circuit 33 which in turn receives signals for the film scanner 13. The steadiness corrected video signal is made available at the output 34 of the correction circuit 32.

As already explained above, in carrying out the method of the invention the reference patterns are first obtained and stored in the memories 22, 23 and 24, for example, by correlating multiple measurement values of the reference criteria and storing the result. Correlation may be done by simple averaging, for example, although other known methods might be desirable when the number of measurements is not very large. For this purpose the switches 19 to 21 are closed, so that the signals generated in the scanning device 14 and prepared by the circuit 18 can be supplied to the respective reference memories 22, 23 and 24, being clocked in by the respective clock signals $f_1$, $f_2$ and $f_3$. After correlation and storage, the several reference patterns in the memories 22, 23 and 24 of the switches 19, 20 and 21 are opened again so that from this point on the prepared measurement signals can be clocked into the memories 25, 26 and 27 while at the same time the motion picture frames will be scanned by the film scanner.

Since only a sprocket hole of the film is scanned and evaluated only if and when it is located directly beneath the scanning device 8, the signal preparation ciruit 18 needs also to be controlled by the tachodisc 19. After the corresponding measurement criteria of the reference signal and the currently measured signal in the comparators 28, 29 and 30, the correction signals that are generated in the computing circuit 31 are processed in accordance with a predetermined evaluation program.

A further possibility of generating a correction signal consists in the evaluation of comparison of picture contents. This is also shown in FIG. 5. For that purpose the video signal provided by the video signal processing circuit 33 is supplied to a picture content comparison circuit 35, which, after comparison of the picture content of several successive motion picture frames to assure that stationary picture features have been used, may provide a corresponding correction signal, which can likewise be used for compensation of picture unsteadiness for the correction circuit 32.

The computing circuit 31 is a computing and operation selection circuit. It is programmed, in a typical case, to establish an order of preference for utilization, selectively, of either the output of the comparator 28, or that of the comparator 29, or that of the comparator 30, or even that of the comparator 35. It will also normally have a way of setting the order of priority or preference accordance to whether the film is an old and much used film, how it has been copied, etc. The matter of establishing the preferential order of reference pattern selection, since it may not come up very often, may conveniently be left to control by a suitable manual switching arrangement.

The sprocket holes elements may be given top priority, but they may be subject to check by some other comparisons, with automatic switching to one of the other two reference pattern memories if the comparator 29 and the comparator 30 should prove to be more consistent with each other than with the comparator 28, for example.

Alternatively the comparator 29 could be given priority when photographic position measuring marks are present on the film. The extent to which the comparator 35 is brought to bear on steadiness control may depend upon the nature of the film, or the nature of the scenes being scanned (i.e. according to whether there is little or much movement in the picture content).

Instead of having only one memory 22, 23 or 24 and one memory 25, 26 or 27 for storage of data relating to a single measurement criterion, it is evidently possible, for example, to store the signals of several sprocket holes, or of several photographically provided marks per motion picture frame, in several respective memories or to provide subdivisions in each memory for each of a set of measurable features relating to one measurement criterion. Likewise it is may be desirable to have more than one memory for a measurement criterion in order to be able to deal with different film sizes.

Figure 10:
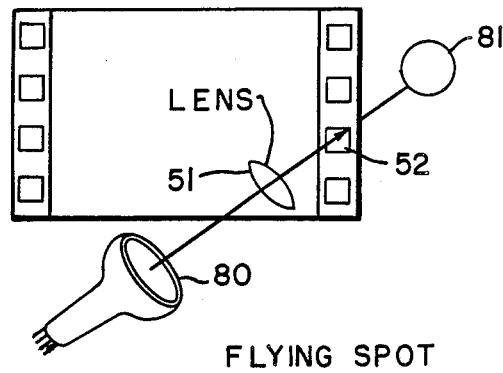
FIG. 10 is a diagram illustrating the use of a flying spot electron beam tube and a photoelectric sensor for oblique scanning of sprocket hole positions.
Figure 11:
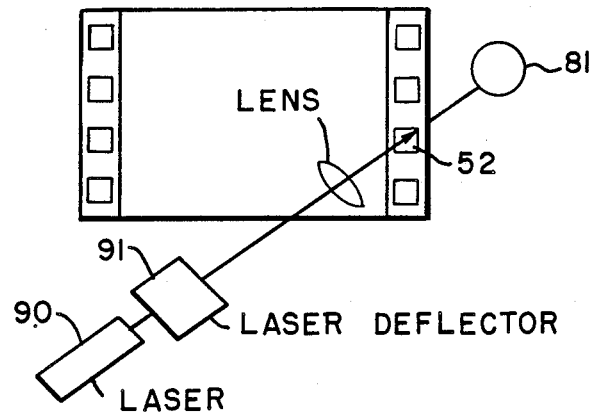
FIG. 11 is a diagram like FIG. 10 showing the use of another flying spot light source, in this case a combination of a laser and a laser deflector for oblique scanning sprocket positions.
Figure 12:
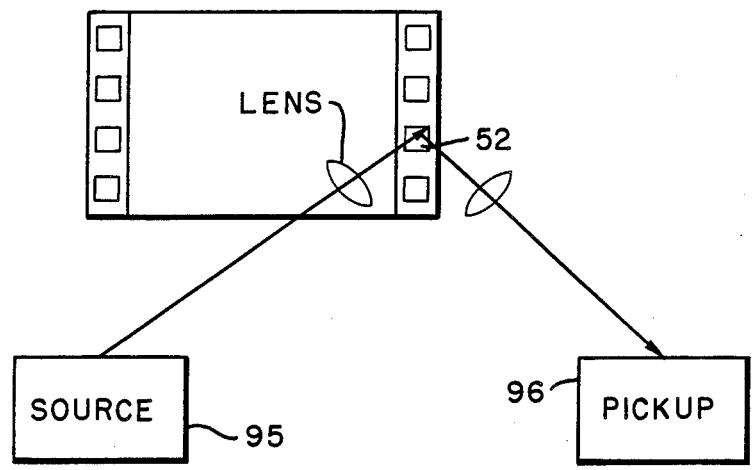
FIG. 12 is a diagram illustrating the oblique scanning of sprocket hole positions in means of light reflected from the film material.
Figure 13:
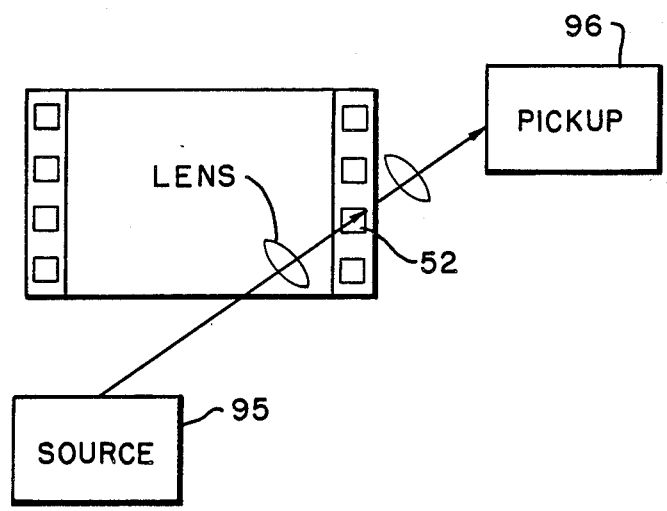
FIG. 13 is a diagram similar to FIG. 12 illustrating the oblique scanning of sprocket hole positions with light transmitted through the film.

FIGS. 6-13 are diagrams illustrating quite schematically the oblique scanning of sprocket holes of a moving film in accordance with the invention in a variety of ways. These diagrams, by way of illustration, refer to scanning of sprocket hole positions, but it is to be understood that these various methods of oblique scanning are also applicable to scanning other positioning reference features provided on the film. In the case of FIGS. 12 and 13, relating to the sensing of light respectively reflected from and transmitted through the film, the direction of reflection may be different for other positioning reference marks or features of the film, and the sensing may be directed to an interruption of light transmission or reflection rather than to a transient brilliance of light reflection or transmission.

Figure 4:
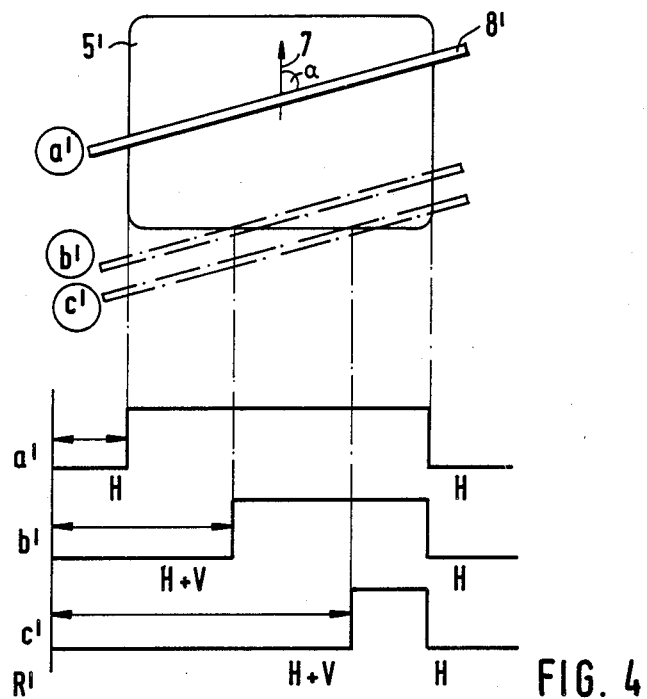
FIG. 4 is a diagram illustrating the scanning of a sprocket hole and a timing diagram like FIG. 2 illustrating pulse signals derived from sprocket hole scanning shown in FIG. 4A.
Figure 6:
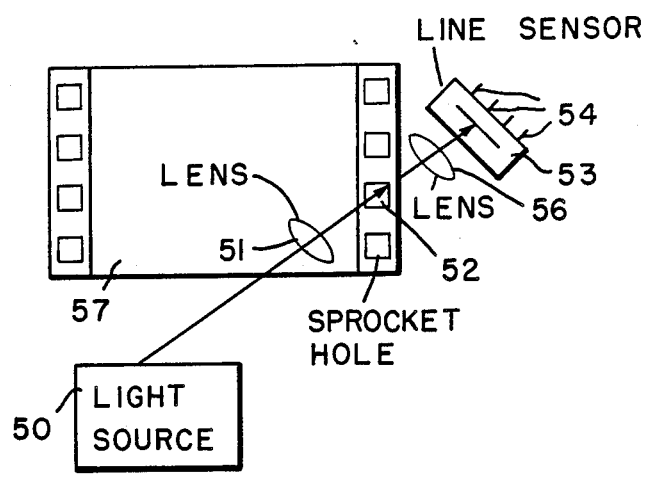
FIG. 6 is a diagram illustrating the use of a light source and a line sensor for oblique scanning of sprocket hole positions.

FIG. 6 illustrates the use of a steady light source 50 focused to a beam by a lens 51, passing through a sprocket hole 52 and incident on a line sensor 53, which is a linear array of a great multiplicity of individual photoelectric sensors such as photodiodes, phototransistors or photomultipliers, each having an individual output, symbolized in FIG. 6 by a relatively small number of output connections 54. In order that the light may be properly focused over the length of the line sensor while preserving the information in the beam passed by the moving sprocket hole, an additional optical unit, symbolized of a lens 55 in FIG. 6, is interposed between the film 57 and the line sensor 53. The oblique position of the line sensor 53 corresponds to the oblique position of the line sensor 8 in FIG. 1 and the line sensor 8' in FIG. 4, but is distorted in FIG. 6 to simply simplify the illustration of FIG. 6 so that FIGS. 6–13 can illustrate the different possibilities of scanning film position features with light without undue complication of illustration.

Figure 7:
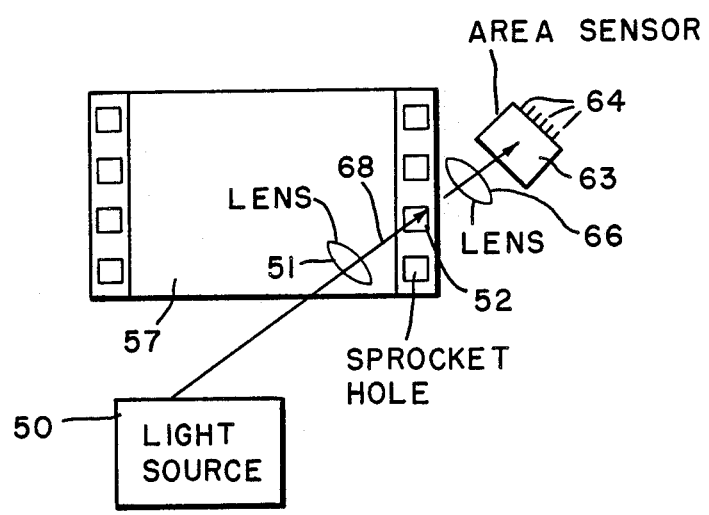
FIG. 7 is a diagram like FIG. 6 illustrating the use of an area sensor for oblique scanning of sprocket hole positions.

FIG. 7 is a diagram similar to FIG. 6 different from FIG. 6 in the use of an elongated area scanner 63 instead of the line scanner 53 of FIG. 6. The lens 66 in FIG. 7 represents an optical unit for focusing light on all parts of the area sensor 63 efficiently for preserving the information of the passage of the light beam 68 through the moving sprocket hole 52. The area sensor 63 has two-dimensional array (not shown) of photoelectric spot sensors each of which has an individual output, these outputs being symbolized in FIG. 7 by a relatively small number of output connections 64.

Figure 8:
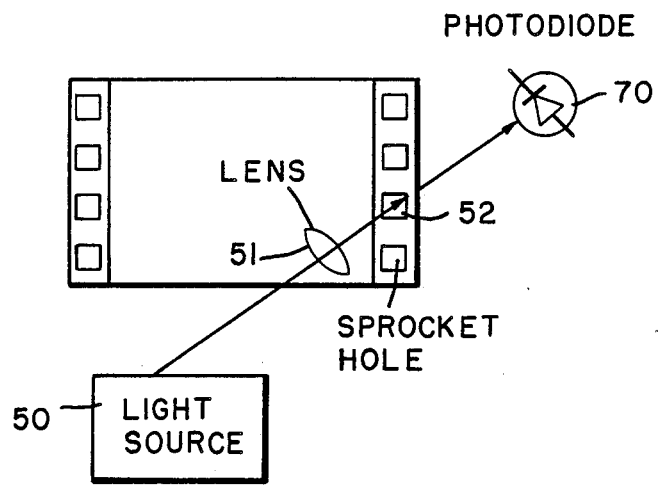
FIG. 8 is a diagram like FIGS. 6 and 7 illustrating the use of a photosensitive semi-conductor device for oblique scanning of sprocket hole positions.

FIG. 8 shows a relatively simple system of oblique scanning, using the steady light source 50, focused at 51, producing a beam passing through a moving sprocket hole 52 for inpingement upon a photodiode 70.

Figure 9:
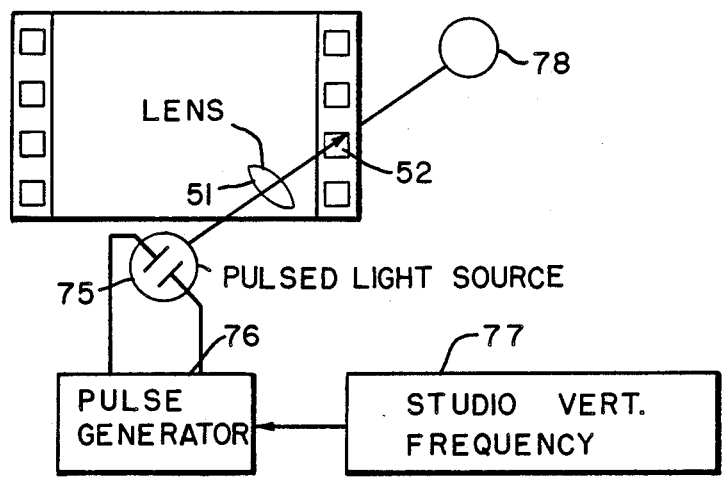
FIG. 9 is a diagram of a pulsed light source (strobe) for oblique scanning sprocket hole positions, with a photoelectric device shown as a sensor.

FIG. 9 illustrates the use of a pulsed light source or "strobe" 75 excited by a pulse generator 76 synchronized to a source 77 of the television vertical scanning frequency available in a television studio, as a source of light, focused again at 51 for being picked up, in this case by a photomultiplier 78, when the latter is illuminated through the sprocket hole 52.

FIGS. 10 and 11 illustrate the use of flying spot light scanners, by which a photoelectric sensor such as a photodiode, phototransistor or photomultiplier will be illuminated by light passing through a sprocket hole 52. FIG. 10 shows a flying spot electron beam tube 80 as the light source, a lens 51 representing the optical means for focusing the flying spot light and a photoelectric sensor 81 being provided for picking up the light.

FIG. 11 differs from FIG. 10 by showing, instead of the flying spot tube 80, a laser 90 and a laser deflector 91, which may be a set of rotating mirrors, to provide flying spot scanning by the variably directed output beam of the laser 90. FIG. 12 shows that the various light source and sensor combinations may be used to illuminate a sensor either by light reflected from the film, as shown in FIG. 12 for the case of reflection from an edge of the sprocket hole 52 or by light transmitted through the film, as in FIG. 13 which shows light passing through the sprocket hole 52 in the same way as illustrated in FIGS. 6–11. In FIGS. 12 and 13 the light source is shown at 95 and the sensor that picks up the light is shown at 96. The scanning direction is oblique, as in FIGS. 6–11, in accordance with the principles illustrated in FIGS. 1 and 4.

Thus, although the invention has been described with reference to particular illustrative examples of the overall circuits and of particular oblique scanning arrangements, it will be understood that variations and modifications, including some different combinations of scanning arrangements and evaluation circuits, are possible within the inventive concept.

I claim:

1. Method of detecting and electronically correcting picture unsteadiness in television scanning of continuously advancing motion picture films comprising the steps of:

scanning, at an oblique angle ($\alpha$) to the direction of advance of the film, by means of a light source and a light sensor, reference features of the film which are selected from the group consisting of sprocket holes of the film, marks produced photographically on the film outside picture boundaries, picture edge boundaries and picture content features determined by picture to picture comparison to be stationary in the picture, in order to produce a scanned position signal pattern, first doing so to produce a reference position signal pattern and then storing said reference signal pattern in a reference pattern memory and thereafter repeating the scanning for transmission of television pictures and producing a currently observed position signal pattern relating to the scanned referenced features;

comparing said reference signal pattern and said currently observed position signal to produce a difference signal;

deriving from said difference signal at least one horizontal correction signal for horizontal picture position correction and at least vertical correction signal for vertical picture position correction and performing, by means of said horizontal and vertical correction signals, electronic compensation of horizontal and vertical unsteadiness in television pictures of scanned motion picture film frames.

2. Method according to claim 1, wherein said first scanning step producing a reference position signal pattern includes scanning a length of film containing a multiplicity of motion picture frames and includes correlating together of the measurements made for said multiplicity of motion picture frames for establishing a faithful reference position signal pattern.

3. Method according to claim 1, wherein the step of deriving at least one correction signal value from said difference signal includes representation of the unsteadiness measure by a vector which when added to all points of the currently observed position signal pattern leads to maximum congruence of the currently observed position signal pattern with the said reference position signal pattern.

4. Method according to claim 1, wherein sprocket holes of the film are scanned and a position signal pattern is derived therefrom only during time intervals during which a sprocket hole lies beneath a scannning device (8) set at an oblique angle ($\alpha$) to the direction of advance of the film.

5. Method according to claim 4, wherein said time intervals for scanning a sprocket hole are fixed by a tachoroller driven by sprocket holes of the film.

6. Method according to claim 1, wherein the scanning of said reference features includes scanning of each motion picture frame at said oblique angle ($\alpha$) in a plurality of positions offset from each other in succession in the direction of movement of the film.

7. Method according to claim 1, wherein said oblique angle ($\alpha$) to the direction of advance of the film is about 75°.

8. Method according to claim 1, wherein the steps of scanning reference features is performed with the use of a light sensitive line sensor (8) disposed, facing the film, at said oblique angle ($\alpha$) to the direction of advance of the film.

9. Method according to claim 1, wherein the steps of scanning said reference features of the film is performed with the use of a light sensitive elongated area sensor exposed facing the film at said oblique angle ($\alpha$) to the direction of advance of the film.

10. Method according to claim 1, wherein the step of scanning by means of a light source and a light sensor is performed with a photoelectric device as a light sensor which is selected from among photodiodes, phototransistors and photomultipliers.

11. Method of detecting and electronically correcting picture unsteadiness in television scanning of continuously advancing motion picture films comprising the steps of:
scanning, at an oblique angle ($\alpha$) to the direction of advance of the film, by means of a light source and a light sensor, reference features of the film of at least two different kinds which are selected from the group consisting of sprocket holes of the film, marks produced photographically on the film outside of picture boundaries, picture edge boundaries, and picture content features found to be stationary by reference to successive pictures, and doing so first, for a particular film, preliminarily to produce a reference position signal pattern for each of said at least two kinds of reference features and thereafter scanning one or another of said at least two kinds of reference features during transmission of television pictures by film scanning, to produce a currently observed position signal pattern;
comparing said currently observed position signal pattern with said reference position signal pattern obtained with the same kind of said reference features to which said currently observed position signal pattern relates, to produce a difference signal;
deriving at least one correction signal from said difference signal, and
performing, by means of said at least one correction signal, electronic compensation of horizonal picture unsteadiness, vertical picture unsteadiness, or both, of television pictures reproduced from scanned motion picture film frames.

12. Method according to claim 11, in which when said at least one correction signal fails, or varies beyond a predetermined range, scanning of said reference features during transmission of television pictures is shifted from one to another of said at least two kinds of reference features.

13. Method according to claim 11, wherein said first scanning step producing a reference position signal pattern includes scanning a length of film containing a multiplicity of motion picture frames and includes correlating together of the measurements made for said multiplicity of motion picture frames for establishing a faithful reference position signal pattern.

14. Method according to claim 11, wherein the step of deriving at least one correction signal value from said difference signal includes representation of the unsteadiness measure by a vector which when added to all points of the currently observed position signal pattern leads to maximum congruence of the currently observed position signal pattern with the said reference position signal pattern.

15. Method according to claim 11, wherein sprocket holes of the film are scanned and a position signal pattern is derived therefrom only during time intervals during which a sprocket hole lies beneath a scannning device (8) set at an oblique angle ($\alpha$) to the direction of advance of the film.

16. Method according to claim 15, wherein said time intervals for scanning a sprocket hole are fixed by a tachoroller driven by sprocket holes of the film.

17. Method according to claim 11, wherein the scanning of said reference features includes scanning of each motion picture frame at said oblique angle ($\alpha$) in a plurality of positions offset from each other in succession in the direction of movement of the film.

18. Method according to claim 11, wherein said oblique angle ($\alpha$) to the direction of advance of the film is about 75°.

19. Method according to claim 11, wherein the scanning of said reference features of the film for producing a currently observed position signal pattern is followed by storing of said currently observed position signal pattern in an observed position signal pattern memory (25, 26, 27).

20. Method according to claim 11, wherein the step of scanning reference features to produce a reference position pattern are performed for different film sizes and film materials to produce multiplicity of selectable stored reference position signal patterns in advance of the step of scanning reference features for a film which is about to be used for transmission of television pictures.

21. Method according to claim 19, wherein a plurality of currently observed position signal pattern memories and a plurality of reference position pattern memories are provided for a corresponding plurality of reference features of the film which are reference features of the same said kind.

22. Method according to claim 11, wherein the steps of scanning reference features is performed with the use of a light sensitive line sensor (8) disposed, facing the film, at said oblique angle ($\alpha$) to the direction of advance of the film.

23. Method according to claim 11, wherein the steps of scanning said reference features of the film is performed with the use of a light sensitive elongated area sensor exposed facing the film at said oblique angle ($\alpha$) to the direction of advance of the film.

24. Method according to claim 11, wherein said reference features are illuminated for the performance of the said scanning steps by a pulsed light source using pulses of a duration which is very small compared to the interval between pulses thereof, and the scanning is performed by means of an elongated area light sensor disposed opposite the film at said oblique angle ($\alpha$) to the direction of advance of the film.

25. Method according to claim 11, wherein said reference features are illuminated, for the purpose of said scanning steps by a flying spot scanner directed at the film obliquely to the direction of advance of the film which scanner illuminates a spot photoelectric light detector.

26. Method according to claim 25, wherein said flying spot scanner comprises an electron beam tube with a light-spot-generating screen.

27. Method according to claim 25, wherein said flying spot scanner comprises a laser beam light source and a scanning laser beam deflector.

28. Method according to claim 11, wherein the step of scanning by means of a light source and a light sensor is performed with a photoelectric device as a light sensor which is selected from among photodiodes, phototransistors and photomultipliers.

29. Method according to claim 12, wherein the step of scanning by means of a light source and a light sensor is performed with a photoelectric device as a light sensor which is selected from among photodiodes, phototransistors and photomultipliers.

30. Method according to claim 11, wherein the scanning steps are performed with light transmitted through the film.

31. Method according to claim 11, wherein the scanning steps are performed with light reflected from the film material.

32. Method of detecting and electronically correcting picture unsteadiness in television scanning of continuously advancing motion picture films comprising the steps of:
storing a reference position signal pattern in respective reference pattern memories corresponding to the result of scanning by means of a light source and a light sensor, at an oblique angle ($\alpha$) to the direction of continuous advance of a motion picture film in a television film scanner, of each of three kinds of standard reference features likely to be provided on motion picture films for control of picture steadiness, which three kinds are, namely, sprocket holes of the film, marks produced photographically on the film outside picture boundaries and picture edge boundaries, said stored reference position signal patterns being based in each case on predetermined standard location data for said reference features;
scanning at said oblique angle ($\alpha$) to the direction of advance of the film, by means reference features of an actual film of at least one of said three kinds of standard reference features, to produce a currently observed position signal pattern relating to said at least one kind of reference features scanned on said film, the scanning being performed in such a way that when the film advances without unsteadiness, said currently observed position signal pattern related to said at least one kind of reference features will be identical with said reference position signal pattern relating to said at least one kind of reference features;
comparing said currently observed position signal pattern with the said reference position signal pattern corresponding to the same kind of reference features, to produce at least one difference signal;
deriving at least one correction signal from said at least one difference signal, and
performing, by means of said at least one correction signal, electronic compensation of horizontal picture unsteadiness, vertical picture unsteadiness, or both, of television pictures reproduced from scanned motion picture film frames.

33. Method according to claim 32, wherein there are derived from said at least one difference signal at least one horizontal correction signal for horizontal picture position correction and at least one vertical correction signal for vertical picture position correction, and wherein electronic compensation of both horizontal and vertical unsteadiness is performed, by means of said horizontal and vertical correction signals, for television pictures of scanned motion picture film frames.

34. Method according to claim 32, wherein the step of deriving at least one correction signal value from said difference signal includes representation of the unsteadiness measure by a vector which when added to all points of the currently observed position signal pattern leads to maximum congruence of the currently observed position signal pattern with the said reference position signal pattern.

35. Method according to claim 32, wherein sprocket holes of the film are scanned and a position signal pattern is derived therefrom only during time intervals during which a sprocket hole lies beneath a scannning device (8) set at an oblique angle ($\alpha$) to the direction of advance of the film.

36. Method according to claim 35, wherein said time intervals for scanning a sprocket hole are fixed by a tachoroller driven by sprocket holes of the film.

37. Method according to claim 32, wherein the scanning of said reference features includes scanning of each motion picture frame at said oblique angle ($\alpha$) in a plurality of positions offset from each other in succession in the direction of movement of the film.

38. Method according to claim 32, wherein said oblique angle ($\alpha$) to the direction of advance of the film is about 75°.

39. Method according to claim 32, wherein the scanning of said reference features of the film for producing a currently observed position pattern is followed by storing of said currently observed position pattern in an observed position signal pattern memory (25, 26, 27).

40. Method according to claim 32, wherein the steps of scanning reference features is performed with the use of a light sensitive line sensor (8) disposed facing the film at said oblique angle ($\alpha$) to the direction of advance of the film.

41. Method according to claim 32, wherein the steps of scanning said reference features of the film is performed with the use of a light sensitive elongated area sensor exposed facing the film at said oblique angle ($\alpha$) to the direction of advance of the film.

42. Method according to claim 32, wherein said reference features are illuminated for the performance of the said scanning steps by a pulsed light source using pulses of a duration which is very small compared to the interval between pulses thereof, and the scanning is performed by means of an elongated area light sensor disposed opposite the film at said oblique angle ($\alpha$) to the direction of advance of the film.

43. Method according to claim 32, wherein said reference features are illuminated for the performance of the said scanning steps by a flying spot scanner directed at the film obliquely to the direction of advance of the film which scanner illuminates a spot photoelectric light detector.

44. Method according to claim 43, wherein said flying spot scanner comprises an electron beam tube with a light-spot-generating screen.

45. Method according to claim 43, wherein said flying spot scanner comprises a laser beam light source and a scanning laser beam deflector.

46. Method according to claim 32, wherein the scanning steps are performed with light transmitted through the film.

47. Method according to claim 32, wherein the scanning steps are performed with light reflected from the film material.

48. Apparatus for detecting and electronically correcting picture unsteadiness in television scanning of a continuously advancing motion picture film by a television film scanner having a film scanning device and means for advancing motion picture film continuously past said film scanning device and having a video output supplied to a video signal processing unit including a picture steadiness control unit having control inputs respectively for electronic horizontal and vertical picture displacement for picture steadiness by correction signals, said apparatus comprising:

film position monitoring means mounted adjacent to said advancing film at a location passed by said film just before it reaches said film scanning device, said monitoring means comprising at least one elongated light sensor extending across at least a portion of said film at an oblique angle to the direction of advance of said film and means for illuminating at least a position of said film passing by said sensor for producing a response of said at least one sensor to position-identifying features of said film selected from the group consisting of sprocket holes, photographic reference marks outside the picture bearing areas of said film and picture edge boundaries, said position monitoring means having a signal output for signals generated by said sensor;

tachoroller means mounted for being driven by motion of said film and having an output for providing pulses at a rate proportional to film speed;

a signal processing circuit having an output and a first input connected to said output said monitoring means and a second input connected to said output of said tachoroller means, for providing a signal at its output indicative of film displacement distinguishable from continuous advance;

a plurality of first memories connected to said output of said signal processing circuit for respectively storing currently observed position patterns respectively related to different kinds of position-identifying features selectable from said group;

a plurality of second memories connectable for storing reference position patterns for comparison with said observed position patterns for detecting picture unsteadiness;

a plurality of comparator means connected for comparing observed position patterns stored in said first memories with corresponding reference position patterns stored in said second memories to produce in each case a difference signal, and correction magnitude computation means connected for receiving a said difference signal, for deriving therefrom horizontal and vertical correction magnitude signals and supplying them respectively to said control inputs of said picture steadiness control unit for producing at an output thereof a video signal free of picture unsteadiness.

49. Apparatus as defined in claim 48 containing also means for comparing contents of successive pictures for identifying picture-stationary features thereof and deriving unsteadiness correction signals therefrom, and means for supplying at least one said unsteadiness signal to at least one said control input of said picture steadiness control unit at least when said unsteadiness signals are deemed preferable to other signals available for supply to said at least one control input of said picture steadiness control unit.

* * * * *